United States Patent [19]

Matsuda et al.

[11] Patent Number: 4,918,477

[45] Date of Patent: Apr. 17, 1990

[54] CAMERA HOUSING WITH GRIPPING RECESSES

[75] Inventors: Hari Matsuda, Evanston; Scott W. Robinson, Northbrook, both of Ill.

[73] Assignee: W. Haking Enterprises, Ltd., Hong Kong

[21] Appl. No.: 271,512

[22] Filed: Nov. 15, 1988

[51] Int. Cl.⁴ ............................................. G03B 17/02
[52] U.S. Cl. ................................ 354/288; 354/149.11; D16/209
[58] Field of Search ............ 354/82, 288, 293, 149.11, 354/145.11; D16/200, 209, 218, 208, 216, 217

[56] References Cited

U.S. PATENT DOCUMENTS

D. 270,840  10/1983  Soda .................................. D16/209
D. 296,215   6/1988  Hansen .............................. D16/209
4,801,960    1/1989  Hansen .............................. 354/288

FOREIGN PATENT DOCUMENTS 1043794  11/1958  Fed. Rep. of Germany ...... 354/288

Primary Examiner—A. A. Mathews
Attorney, Agent, or Firm—Wallenstein, Wagner & Hattis, Ltd.

[57] ABSTRACT

A generally rectangular still camera housing is provided with a pair of arcuate recesses in the front surface configured to accept the user's fingers in a variety of confortable gripping positions. The recess walls are configured to acceptingly guide the user's fingers so as not to accidentally obstruct the objective lens and/or camera flash unit.

12 Claims, 4 Drawing Sheets

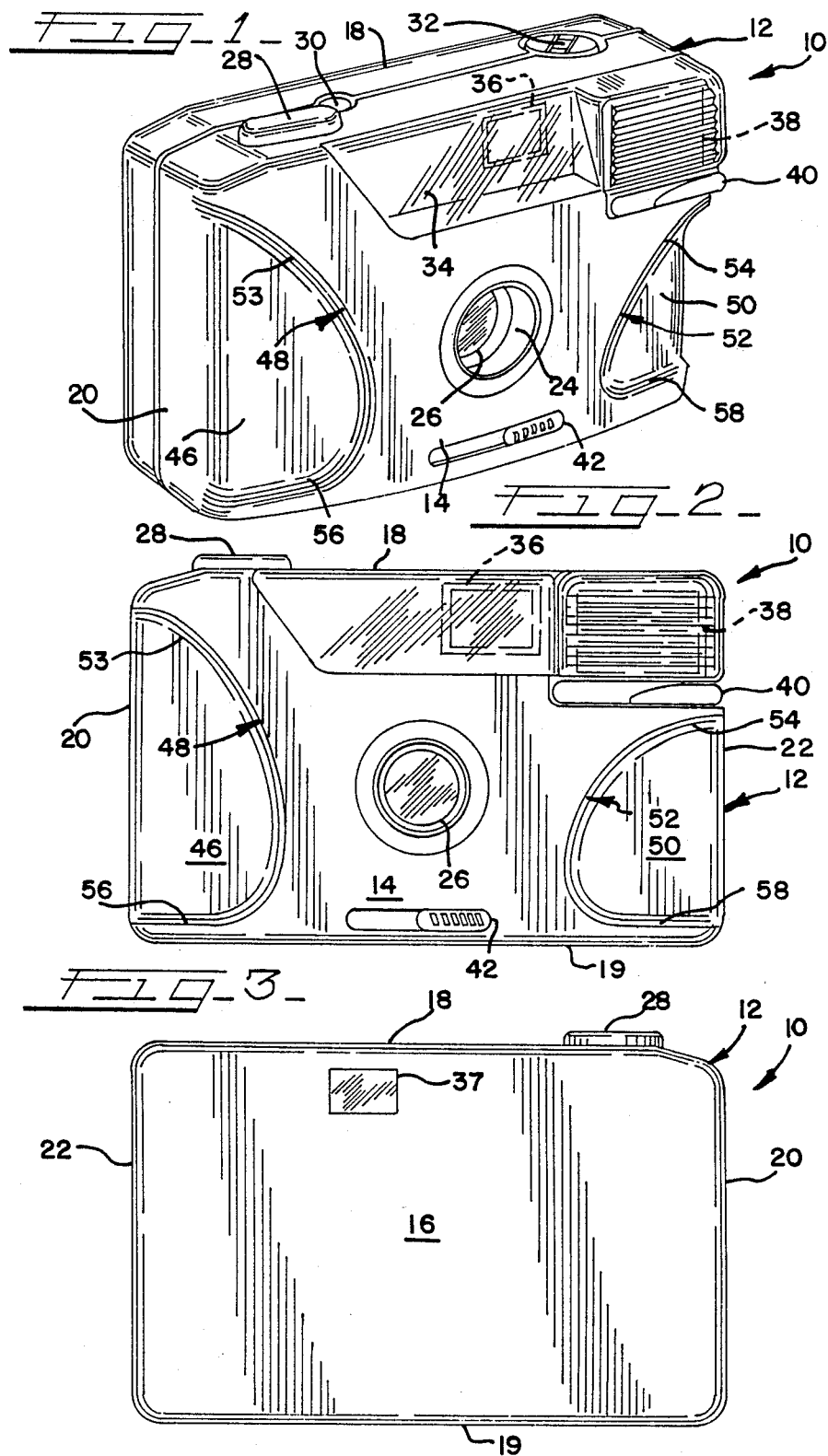

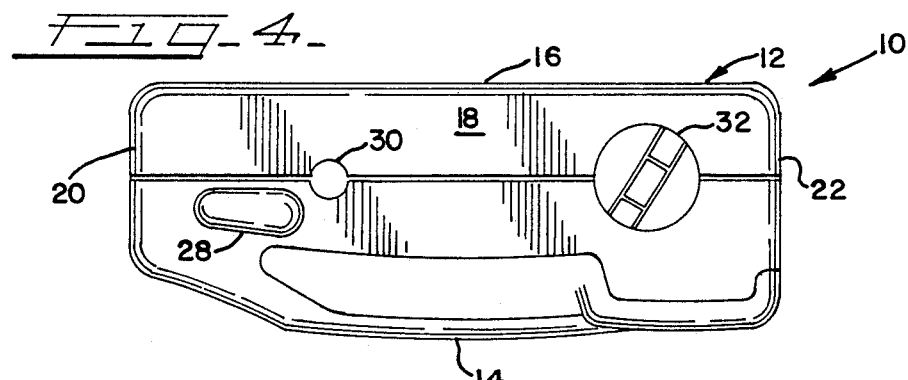
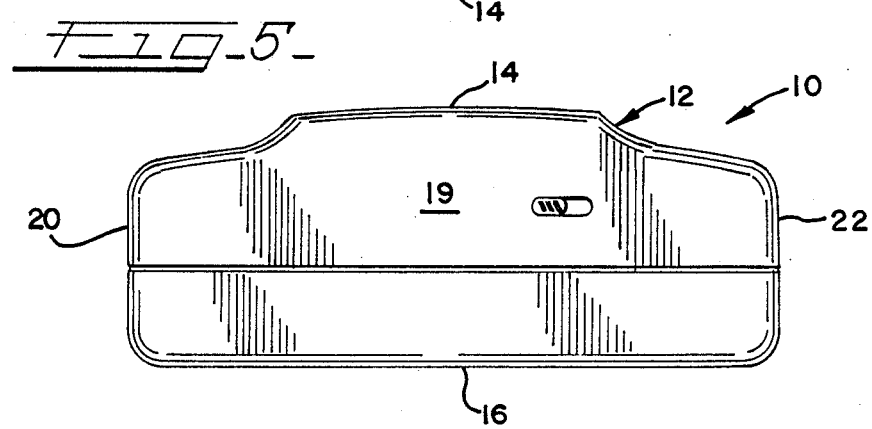
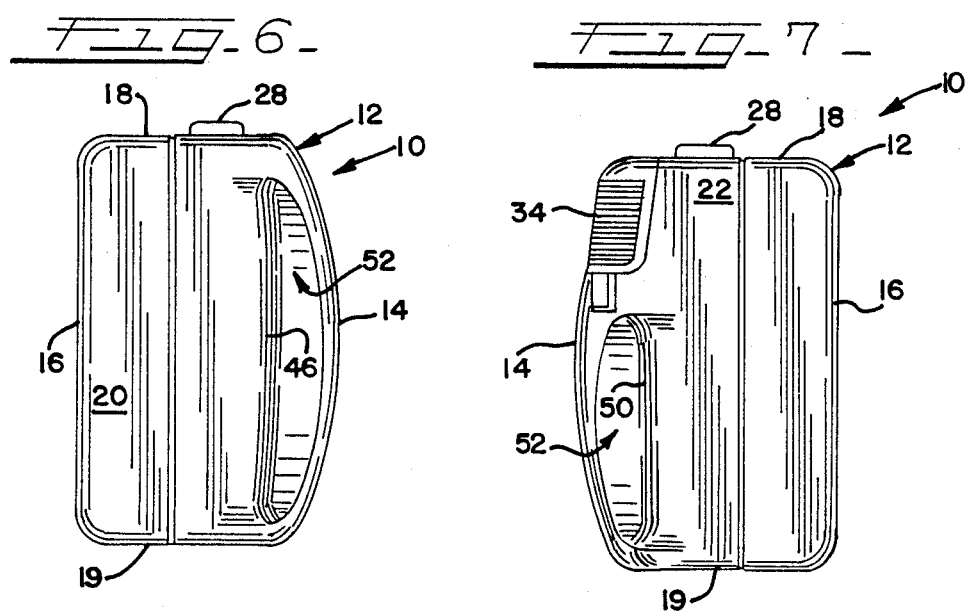

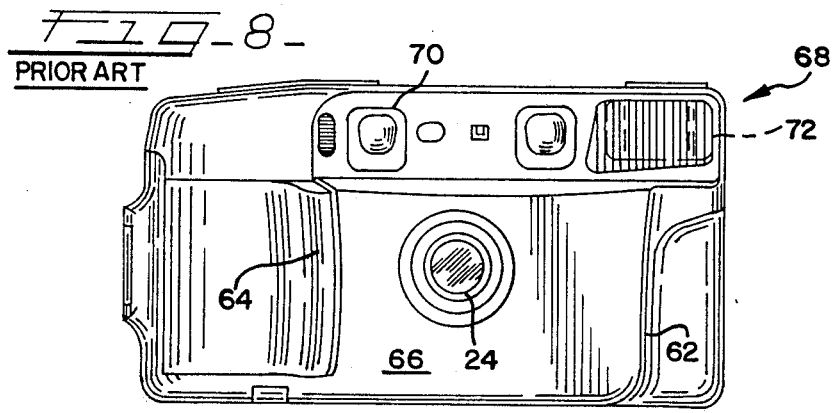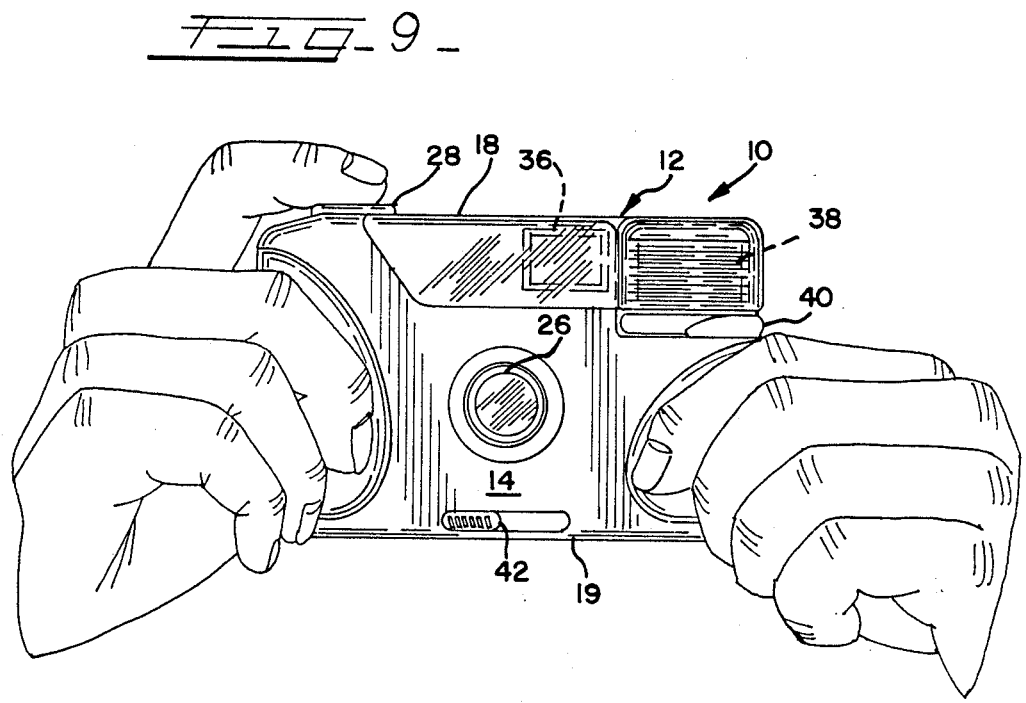

CAMERA HOUSING WITH GRIPPING RECESSES

DESCRIPTION

1. Technical Field

The technical field of the invention is hand-held cameras, and in particular housings therefor.

2. Background Prior Art

Still cameras are sometimes provided with finger-gripping surfaces to enable the user to more comfortably grip the camera. Often the countours of the gripping surfaces are so dimensioned in their design that they are comfortable for hands of one size and not another, and they are frequently not configured for alternate positioning of the fingers for a comfortable grip. It is thus readily possible for the user of such cameras to grip the camera in a position where the user would be blocking a portion of the lens aperture or the flash window in cameras with built-in flash units.

It would therefore be desirable to design a still camera with unique finger-gripping surfaces to prevent accidental positioning of the fingers so as to obstruct the lens aperture or the flash window and to allow a variety of gripping positions of the user's fingers. The present invention provides a unique gripping surface of at least one and preferably both the hands of the user to accomplish this objective. Specifically, the right hand of the user is generally used as the main gripping hand. The index finger thereof is used to press the shutter release button, and its other fingers are used to grip the camera body. The left hand of the user is sometimes used to further steady the camera. Generally the left is positioned opposite a built-in flash window. Either hand could so position as to cause an obstruction of the lens aperture, especially in very small cameras.

Small hand-held cameras are sometimes provided with finger-guiding recesses on the front face of the camera housing to assist in positioning the user's fingers. They often did not provide for a wide selection of effective comfortable gripping positions which assure that the user's fingers would not obstruct the flash and/or lens opening.

SUMMARY OF THE INVENTION

The preferred camera of the instant invention has a pair of gripping recesses rearwardly offset into the front face of a camera housing, preferably on both sides of the camera lens. The recesses join smoothly with the camera side walls, and terminate in arcuate bounding walls forming a step joining each recess to the housing front face preferably at a sharp angle. In the preferred embodiment each step-forming wall extends from its associated side of the camera in the form of approximately one quarter circle arc extending across the front face preferably at least half of the distance between its associated sidewall and the objective lens, and terminating at its lower end in a rapid retrace region close to the lower edge of the camera housing front face. The recesses are formed to accept the fingers of the user's hands in a variety of comfortable positions and serve to unambiguously locate them during rapid operation of the camera so as not to block the relevant optical elements of the system, in particular the lens, the flash unit window, and associated range finder and viewer elements mounted on the front wall of the camera. While one prior art camera (see, for example, FIG. 8) shows recesses in the front face of a camera housing, these recesses are differently shaped from those just described, and they do not afford the wide selection of effective, comfortable gripping positions as the recesses of the present invention.

When the camera is grasped by the user the arcuate portions of the step-forming walls will comfortably accept the curled middle finger of the right hand and the curled index finger of the left hand lying flat against their associated recesses, with the index finger of the right hand properly positioned on the shutter release button. The recesses also are grippable with the fingers extended, where the arcuate portion of the step-forming wall of the right-hand-accepting recess confrontingly abuttingly accepts the tip end of the middle finger of the right hand, with the index finger placed on the shutter release button. The ring finger of the right hand can then be placed along side and into engagement with the right hand recess. The left hand recess is configured to aligningly accept the index and middle fingers of the left hand, or alternatively to accept the middle and ring finger of the left hand, with the index finger placed safely on top of the housing and away from the flash unit on the upper right hand corner thereof.

Other advantages and features of the invention will become apparent upon making reference to the specification, claims and drawings to follow.

BRIEF DESCRIPTION OF DRAWINGS

FIG. 1 is a perspective view of the camera housing of the present invention.

FIG. 2 is a front elevational view of the camera shown in FIG. 1.

FIG. 3 is a rear elevational view of the camera shown in FIG. 1.

FIG. 4 is a top view of the camera shown in FIG. 1.

FIG. 5 is a bottom view of the camera shown in FIG. 1.

FIG. 6 is a right elevational end view of the camera shown in FIG. 1.

FIG. 7 is a left elevational end view of the camera shown in FIG. 1.

FIG. 8 shows a prior art camera.

FIGS. 9-11 show alternative gripping positions of the user's hands when using the camera shown in FIG. 1.

DETAILED DESCRIPTION

Figure 10:
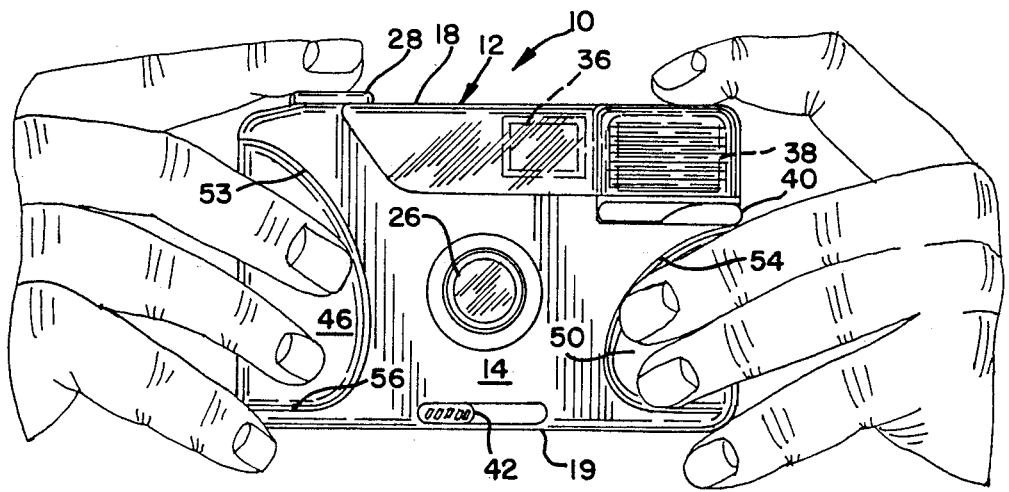

There is shown in the drawings and will herein be described in detail a preferred embodiment of the invention with the understanding that the present disclosure is to be considered as an exemplification of the principles of the invention and is not intended to limit the broadest aspects of the invention to the embodiment illustrated.

Figure 11:
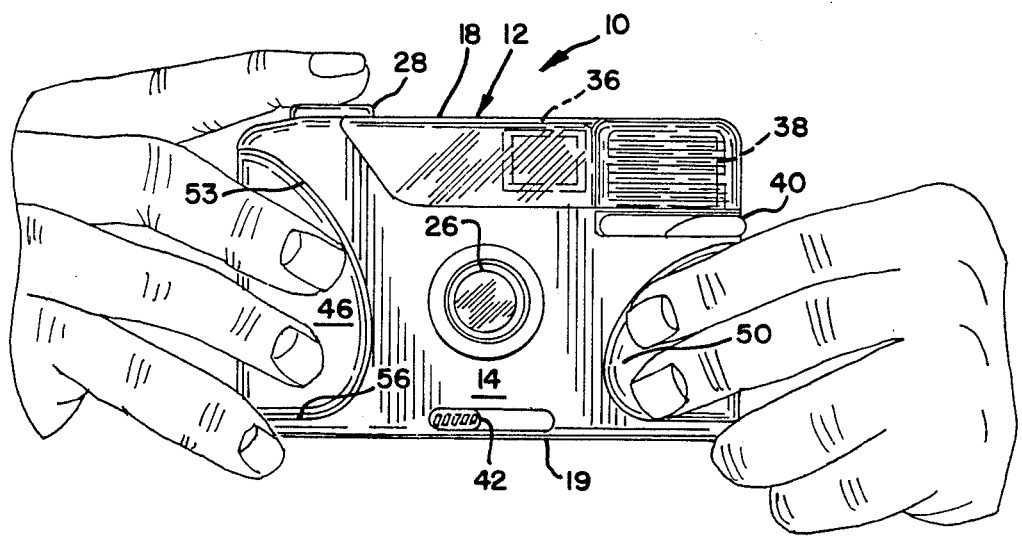

Referring now to the Figures, FIGS. 1-7 show various views of the camera 10 of the instant invention, FIG. 8 shows a prior art camera housing, and FIGS. 9-11 show the camera of the instant invention grasped by the user in three different ways. Considering first the views shown in FIGS. 1-7, camera 10 is provided with a housing 12 having generally parallel major front and rear walls respectively and joined at their upper and lower surfaces by generally planar top and bottom walls 18, 19 respectively, and at their respective sides by generally planar right-hand and left-hand side walls 20, 22 respectively. Hereafter the term "right-hand" and "left-hand" will refer to those portions of the camera associated with the user's right and left hands respectively. Thus, for example, the right-hand side wall 20 is on the left side of the camera as seen in the front elevational view of FIG. 2. This terminology will be employed consistently throughout.

Generally centrally located on the front wall 14 is a lens opening 24 with the camera objective lens 26 located therein. Along the top wall 18 there is disposed a shutter release button 28 near the right-hand side wall 20, configured in the embodiment shown in the form a generally rectangular bar. Also, a film counter window 30 is disposed in the top wall 18, as is a flush-mounted rewind knob 32. A clear housing window 34 traversing along an upper portion of the front wall 14 shieldingly protects a viewfinder window 36 and a flash unit 38. A corresponding viewfinder rear window 37 is located on the rear wall 16 of the housing 12. A flash charger switch 40 is mounted immediately below the flash unit 38, and is operable by the user to energize or de-energize a charging unit (not shown) for the flash unit 38. Two-position focus adjustment is achieved by manual operation of a focus slider member 42 mounted on the lower portion of the front wall 14.

A pair of specially configured recesses are formed rearwardly offset from the front wall 14. A right-hand recess is formed by a rearwardly generally planar recess face 46 joining the front wall 14 at a generally arc-shaped right-hand step-forming recess wall 48 and smoothly joining the right-hand side wall 20. Similarly, a rearwardly offset left-hand recess face 50 joins the front wall 14 of the housing 12 at a generally arc-shaped step-forming recess wall 52, smoothly joining the left-hand side wall 22 at the outer extent thereof. As best seen in FIG. 2 the right and left upper wall portions 53, 54 form crudely one quadrant of a circular arc, each having respective lower wall portions 56, 58 rapidly retracing towards their respective side walls 20, 22 along generally linear lower edges. The recess walls 48, 52 preferably join the front wall 14 so as to form a readily felt sharply angled boundary, but join their associated recess faces 46, 50 smoothly.

It will be noted that the recess faces 46, 50 both extend well across the front wall 14, and in the embodiment shown extend at least half-way from the side walls 20, 22 to the nearest edge of the lens 26. Additionally, it will be noted that the upper wall portion 54 associated with the left-hand recess face 50 is disposed so as to position the user's fingers so as not to obstructingly confront the flash unit 38.

Referring now to FIGS. 9-11, it will be seen that recess walls 48, 52 are positioned to accommodate the fingers of the user in a variety of comfortable orientations in use. Thus, FIGS. 9-11 show three different ways in which the camera 10 may be grasped. The recess walls 48, 52 are designed to provide a comfortable grip in three different ways, and in all cases are designed to assure that the user will grip the camera in a position where neither hand will obstruct the lens opening 24 and the left hand will not obstruct the flash unit 38.

Thus, considering the hand positions shown in FIG. 9, the index finger of the right hand may be comfortably placed on the shutter release bar 28, and the middle finger may be comfortably curled to lie against the right hand recess face 46, the arcuate upper wall portion 52 being configured to comfortably accept the middle finger and to prevent it from accidentally covering, for example, lens 26. The left hand recess face 50 is similarly curved to accept the curved index finger of the user's left hand.

The foregoing is to be contrasted with a prior art camera of FIG. 8, having finger-guiding walls 62, 64 disposed on the front face 66 of a housing 68. With respect to the guide walls 64 it will be noted that there is no upper contour tending to force the user's fingers away from the upper central portion of the housing 68. As a result, when operating the camera under hurried circumstances there is little if any prevention against accidentally obstructing upper portions of the camera, as for example, a range finder detector window 70, thereby accidentally impairing autofocus operation of the camera. The right-hand recess wall 48 of the present invention, on the other hand, tends to prevent such malpositioning.

It will also be noted in FIG. 8 that the finger-guiding wall 62, although providing a measure of protection against accidentally occluding the flash unit 72, is not configured to be easily grasped in the position shown in FIG. 9. Moreover, by configuring the recess walls 48, 52 to and having a quarter-circle arcuate upper wall portion 53, 54 and a generally linear lower wall portion 56, 58 retracing to the associated side walls 20, 22, an adequately large grasping area is provided on both faces of the camera housing 12, while providing for additional prevention against accidental slippage of the fingers out of engagement with lower portions of the recess faces 46, 50.

FIGS. 10 and 11 show alternative methods of grasping the camera housing 12. In both Figures with the index finger of the right hand placed on the shutter release bar 28, the tip end of the extended middle finger abuts the upper wall portion 53. Sufficient space is available to accommodate the ring finger of the right hand as well. With respect to the positioning of the right hand, FIG. 10 shows one hand position wherein the index finger is placed in contact with the top wall 18 of the camera housing 10, and the middle finger and ring finger abut portions of the upper and lower wall portions 54, 58. Alternatively, as shown in FIG. 11, the middle finger and index finger of the left hand may be so positioned.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

We claim:

1. In a generally rectangular still camera housing having generally parallel vertical front and rear wall faces joined by first and second vertical side wall faces and top and bottom wall faces, a depressible shutter release button on said top wall surface adjacent the right end thereof and to be depressed by the index finger of the right hand, said front wall face having an objective lens window between said side wall faces, the improvement comprising: a first gripping area to one side of said lens opening for the user's right hand, said area being a first recessed surface inwardly offset into said front wall face, the outer margin of said first recessed surface extending to said first side wall face, the inner margin of said first surface being defined by a first terminal step forming a finger-guiding bounding surface joining said first recessed surface to said front wall face and extending along a concave arc extending across said front wall face from an upper portion of said first side wall surface where it intersects the same substantially transversely thereto and then progressively curves in the same direction downwardly thereafter where it reaches a substantially vertical extent in the lower half of the recessed surface, to serve as a barrier between the user's fingers and said lens opening the size and location of said first recessed surface enabling the tip end of the user's middle finger to be placed in abutment with a portion of said first terminal step when the tip end of the user's index finger is placed in contact with said depressible shutter release button on said top wall face.

2. The camera of claim 1 wherein said front wall face of said camera has a second gripping area on the opposite side of said lens window for the user's left hand, said second gripping area being a second recessed surface inwardly offset into said front wall face, the outer margin of said second recessed surfaces extending to said second side wall face, the inner margin of said second recessed surface being defined by a second terminal step forming a finger-guiding bounding surface joining said second recessed surface.

3. The camera of claim 2 wherein said second terminal step extends along a concave arc extending across said front wall face from an upper portion of said second side wall face where it intersects the same substantially transversely thereto and then progressively curves in the same direction downwardly thereafter where it reaches a substantially vertical extent in the lower half of the recessed surface, to serve as a barrier between the user's left hand fingers and said lens window, the size and location of said second recessed surface enabling the tip end of one or more of the user's fingers to be placed in abutment with a portion of said second terminal step.

4. The camera of claim 3 further including a flash illumination source disposed proximate to the upper edge of said housing front wall face and said first side wall, the upper portion of said second terminal step being configured to extend across and below said illumination source so as to constrain the fingers of the user's left hand to regions spaced away from said illumination unit.

5. The camera of claims 1 or 3 wherein a lower portion of said concave first terminal step curves outwardly to join said first side wall at a point proximate to but separated from the bottom of said front housing face.

6. The camera of claim 5 wherein said lower portion of said terminal step is generally linear over a terminal portion of its length.

7. The camera of claims 2 or 3 wherein a lower portion of said second terminal step curves outwardly to join said second side wall at a point proximate to but separated from the bottom of said front housing face.

8. The camera of claim 7 wherein said lower portion of said second terminal step is generally linear over a terminal portion of its length.

9. The camera of claim 3 wherein said inwardly offset surfaces of said recesses are generally planar and parallel to the vertical front face of said housing.

10. The camera of claim 3 wherein said terminal steps extend across said front housing to least one-half of the distance between their associated side walls and the nearest edge of said objective lens opening.

11. The camera of claim 3 wherein said terminal steps are configured to join their associated recesses in a smooth curve and said front wall at a sharp angle thereto.

12. In a generally rectangular still camera housing having generally parallel vertical front and rear housing wall faces joined by first and second vertical side wall faces and top and bottom wall faces, a built-in flash unit adjacent the left end of said top wall faces; said front face having an objective lens window between said side wall faces, the improvement comprising said front wall face of said camera having a gripping area on the left side of said lens window for the user's left hand, said gripping area being a recessed surface inwardly offset into said front wall face, the outer margin of said recessed surface extending to said second side wall face, the inner margin of said recessed surface being defined by a terminal step forming a finger-guiding bounding surface joining said recessed surface; said terminal step extending along a concave arc extending across said front wall face from an upper portion of said second side wall surface where it intersects the same substantially transversely thereto and then progressively curves in the same direction downwardly thereafter where it reaches a substantially vertically extent in the lower half of the front surface, to serve as a barrier between the user's left hand fingers and said lens opening and flash unit, the size and location of the recessed surface enabling the tip end of one or more of the user's fingers to be placed in abutment with a portion of said first terminal step.

* * * * *